(12) United States Patent
Ito

(10) Patent No.: US 7,406,223 B2
(45) Date of Patent: Jul. 29, 2008

(54) OPTICAL ELEMENT AND METHOD OF MOLDING THE SAME

(75) Inventor: Takashi Ito, Saitama (JP)

(73) Assignee: Fujinon Corporation, Saitama (JP)

( * ) Notice: Subject to any disclaimer, the term of this patent is extended or adjusted under 35 U.S.C. 154(b) by 215 days.

(21) Appl. No.: 11/002,515

(22) Filed: Dec. 2, 2004

(65) Prior Publication Data

US 2005/0123238 A1 Jun. 9, 2005

(30) Foreign Application Priority Data

Dec. 9, 2003 (JP) ............................. 2003-410661

(51) Int. Cl.
*G02B 6/32* (2006.01)

(52) U.S. Cl. .................... 385/33; 385/31; 385/39; 385/147; 385/901; 359/727; 359/642; 264/1.7; 425/808

(58) Field of Classification Search ............ 385/31, 385/33, 39, 147, 901; 359/727, 642; 264/1.7; 425/808

See application file for complete search history.

(56) References Cited

U.S. PATENT DOCUMENTS

| 4,208,102 | A | * | 6/1980 | Ohkura | 359/436 |
| 4,461,547 | A | * | 7/1984 | Ikari et al. | 359/611 |
| 5,276,552 | A |   | 1/1994 | Kohmoto et al. | |
| 5,374,668 | A | * | 12/1994 | Kanemura et al. | 523/451 |
| 5,581,412 | A | * | 12/1996 | Tanaka | 359/697 |
| 5,861,998 | A | * | 1/1999 | Nishimura | 359/694 |
| 5,995,304 | A | * | 11/1999 | Nomura et al. | 359/726 |

FOREIGN PATENT DOCUMENTS

JP 2003-298885 10/2003

* cited by examiner

*Primary Examiner*—Frank G Font
*Assistant Examiner*—James P Hughes
(74) *Attorney, Agent, or Firm*—Jordan and Hamburg LLP

(57) ABSTRACT

The present invention provides an optical element capable of preventing a ghost in the use for a sensor such as a CCD or CMOS. In the optical element including an optical function surface of high surface accuracy and a flange formed around the surface, the optical function surface having an optical surface diameter somewhat larger than an effective diameter in order to secure high surface accuracy for the effective diameter, a parting diameter of a molding die is made larger than the optical surface diameter and a parting position is disposed outside the optical surface diameter.

2 Claims, 8 Drawing Sheets

(a)

(b)

OPTICAL ELEMENT AND METHOD OF MOLDING THE SAME

BACKGROUND OF THE INVENTION

1. Field of the Invention

The present invention relates to an optical element used for a sensor such as a CCD and CMOS, and particularly relates to an optical element and a method of molding the same whereby a ghost is prevented.

2. Description of the Related Art

In recent years, as compact digital cameras mounted in mobile telephones or the like have increased in functionality and accuracy, higher accuracy is demanded of small sensor lenses used for the digital cameras.

FIG. 1 shows the configuration of a lens using a sensor (including a CCD and CMOS) of a compact digital camera mounted in a mobile telephone or the like.

In a sensor lens 100 of FIG. 1, first to third optical elements 101 to 103 are fixed to a lens-barrel 105 with adhesive 104 and the optical elements with the lens-barrel are mounted in a mounting holder 106 which has a cover glass 107. In the sensor lens 100, light incident from a condensing port 105a of the lens-barrel 105 converges through the first to third lenses 101 to 103 and an image is formed on a sensor image-forming surface 108.

For example, an optical element used for a sensor lens includes a glass grind lens, a glass molded lens, and a plastic lens. Such an optical element is constituted of an optical function surface of high surface accuracy and a flange formed around the surface.

In the sensor lens using the optical element composed of the optical function surface of high surface accuracy and a flange formed around the surface, the sensor image-forming surface is adversely affected by the scattering of light having been incident outside the optical function surface of the optical element, resulting in a ghost or flare. For example, unexpected light (scattered light) is caused by internal reflection in the optical element and a mechanical part such as a lens-barrel. The scattered light reaches the sensor image-forming surface and causes a ghost or flare. A sensor lens is known which comprises a stopper 109 for interrupting the entry of scattered light into a sensor image-forming surface, the scattered light having been caused by a light beam incident outside an optical function surface, e.g., on a flange, so that a ghost or flare caused by the scattered light is prevented (e.g., Japanese Utility Model Laid-Open No. 2-107111 and Japanese Patent Laid-Open No. 2003-298885).

However, even in the sensor lens comprising the stopper 109 for interrupting scattered light caused by light having been incident outside the optical function surface, e.g., on the flange, it is not possible to completely eliminate a ghost. Further, as compact digital cameras have increased in functionality and accuracy, just a small ghost seriously affects the function and accuracy.

A solution for preventing such a small ghost is to reduce the interior diameter of the stopper 109. However, when the stopper 109 is reduced in internal diameter, a peripheral luminous flux decreases in light quantity as compared with a central luminous flux, thereby darkening the corners of an image.

SUMMARY OF THE INVENTION

It is an object of the present invention to provide an optical element which can prevent a ghost without reducing the internal diameter of a stopper.

In order to attain the object, the present invention provides an optical element comprising an optical function surface of high surface accuracy and a flange formed around the surface, the optical function surface having an optical surface diameter somewhat larger than the effective diameter in order to secure high surface accuracy for the effective diameter, wherein a molding die has a parting diameter larger than the optical surface diameter and a parting position is disposed outside the optical surface diameter.

According to the optical element of the present invention, it is possible to prevent a ghost without reducing the internal diameter of a stopper, so that a peripheral luminous flux is not reduced in light quantity and the corners of an image are not darkened. Further, it is possible to obtain an optical element capable of preventing a ghost without special after treatment and readily mold the optical element capable of preventing a ghost.

DETAILED DESCRIPTION OF THE PREFERRED EMBODIMENTS

The following will describe an embodiment of the present invention in accordance with the accompanying drawings.

Figure 2:
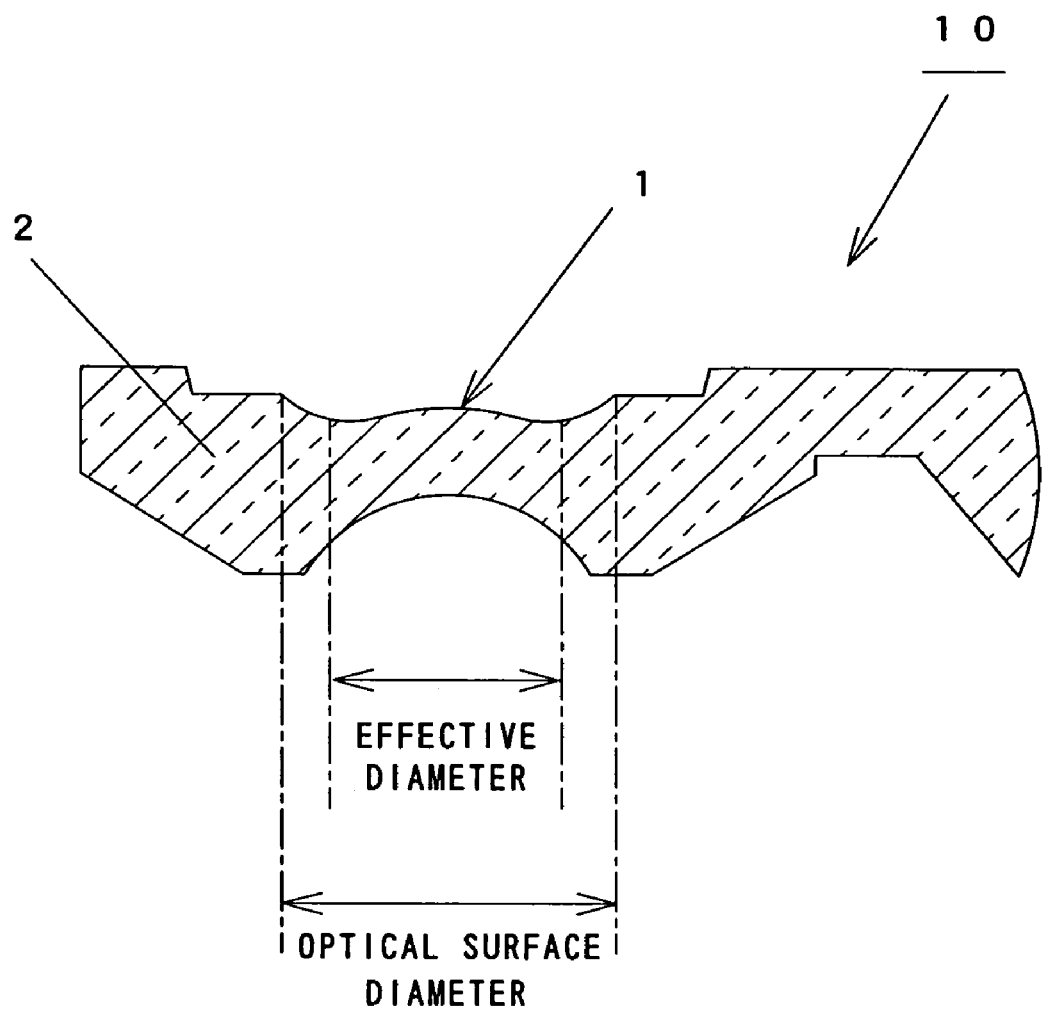
FIG. 2 is a diagram showing an optical element which achieves high surface accuracy for an effective diameter.

As shown in FIG. 2, in an optical element 10 constituted of an optical function surface 1 of high surface accuracy and a flange 2 formed around the surface 1, the optical function surface 1 has a somewhat larger optical surface diameter than an effective diameter in order to secure high surface accuracy for an effective diameter.

That is, in the molding of the optical element 10, the optical function surface 1 is formed with an optical surface diameter somewhat larger than the effective diameter, so that accuracy for the effective diameter is secured. In order to secure accuracy for the effective diameter, it is enough to set an optical surface diameter which is about 0.1 mm larger than the effective diameter (about 2% relative to the effective diameter).

Figure 3:
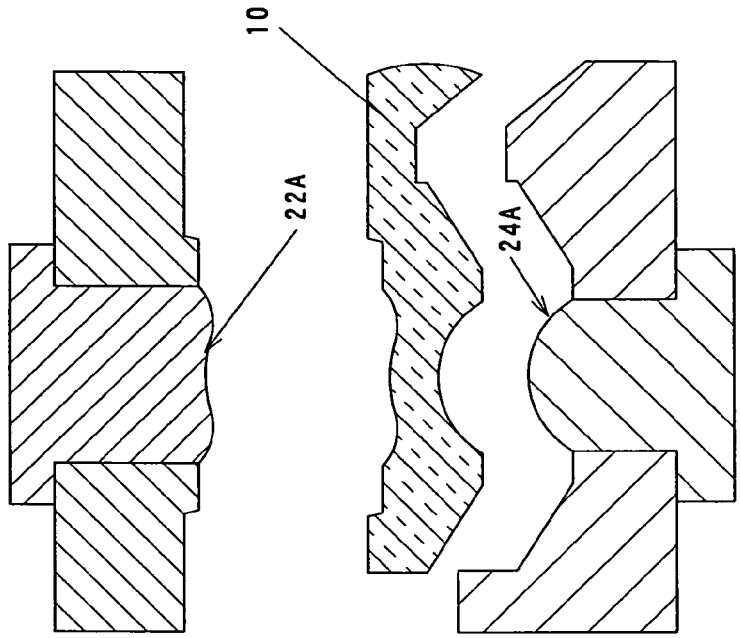
FIG. 3 is a diagram showing the molding die of the optical element shown in FIG. 2.
Figure 3:
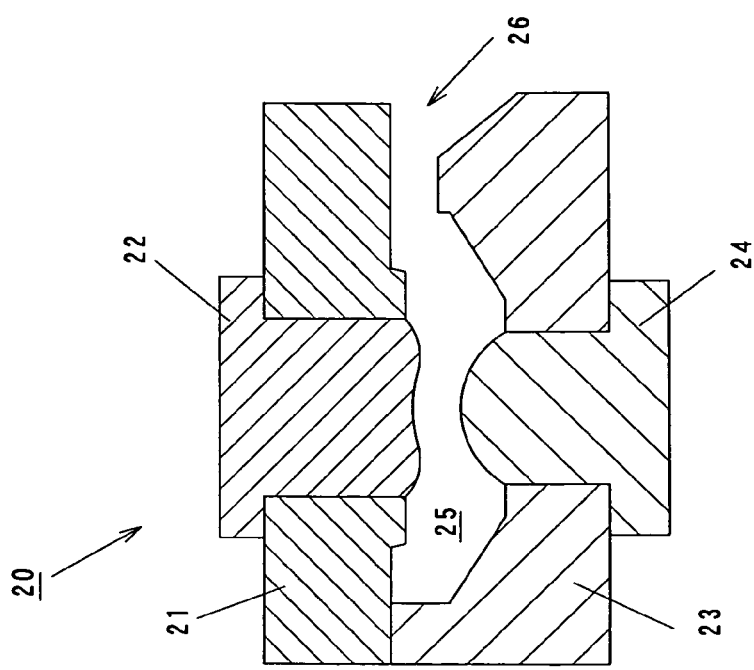

FIG. 3 shows a molding die 20 used for molding the optical element 10 having the optical function surface of high surface accuracy.

In the molding of the optical element 10 constituted of the optical function surface 1 of high surface accuracy and the flange 2 formed around the surface 1, the molding die 20 is used in which a pair of dies (a cope 21 and a drag 23) comprises cores 22 and 24 having transfer surfaces 22A and 24A of high surface accuracy. The optical function surface 1 of the optical element 10 is formed by the transfer surfaces 22A and 24A of the cores 22 and 24.

As shown in FIG. 3(*a*), a resin material is fed from a gate 26 into a cavity 25 surrounded by the cope 21 having the core 22 and the drag 23 having the core 24, so that the optical element having the optical function surface of high surface accuracy is molded.

In the conventional art, as shown in FIG. 3(*b*), an optical element having an optical function surface of high surface accuracy is molded by cores 22 and 24 whose parting diameter (transfer surface diameter) is equal to the optical surface diameter of the optical function surface of the optical element 10.

Regarding the sensor lens using the optical element where the optical function surface of high surface accuracy is formed by cores whose parting diameter (transfer surface diameter) is equal to the optical surface diameter of the optical function surface of the optical element, the inventor of the present application made the following considerations to find a cause of a ghost.

Figure 4:
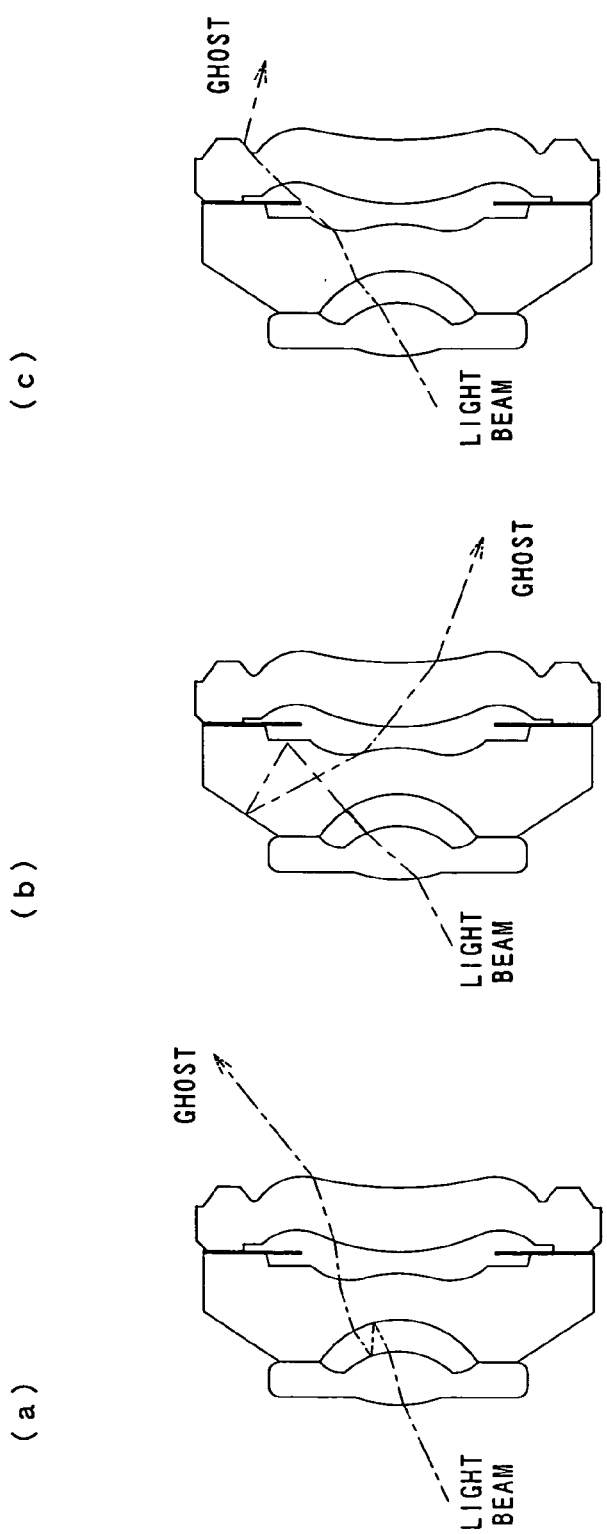
FIG. 4 is a diagram showing a ghost generated by the surface reflection of the optical element.

FIG. 4 shows the surface reflection of the optical element. The surface reflection is regarded as a cause of a ghost.

Figure 1:
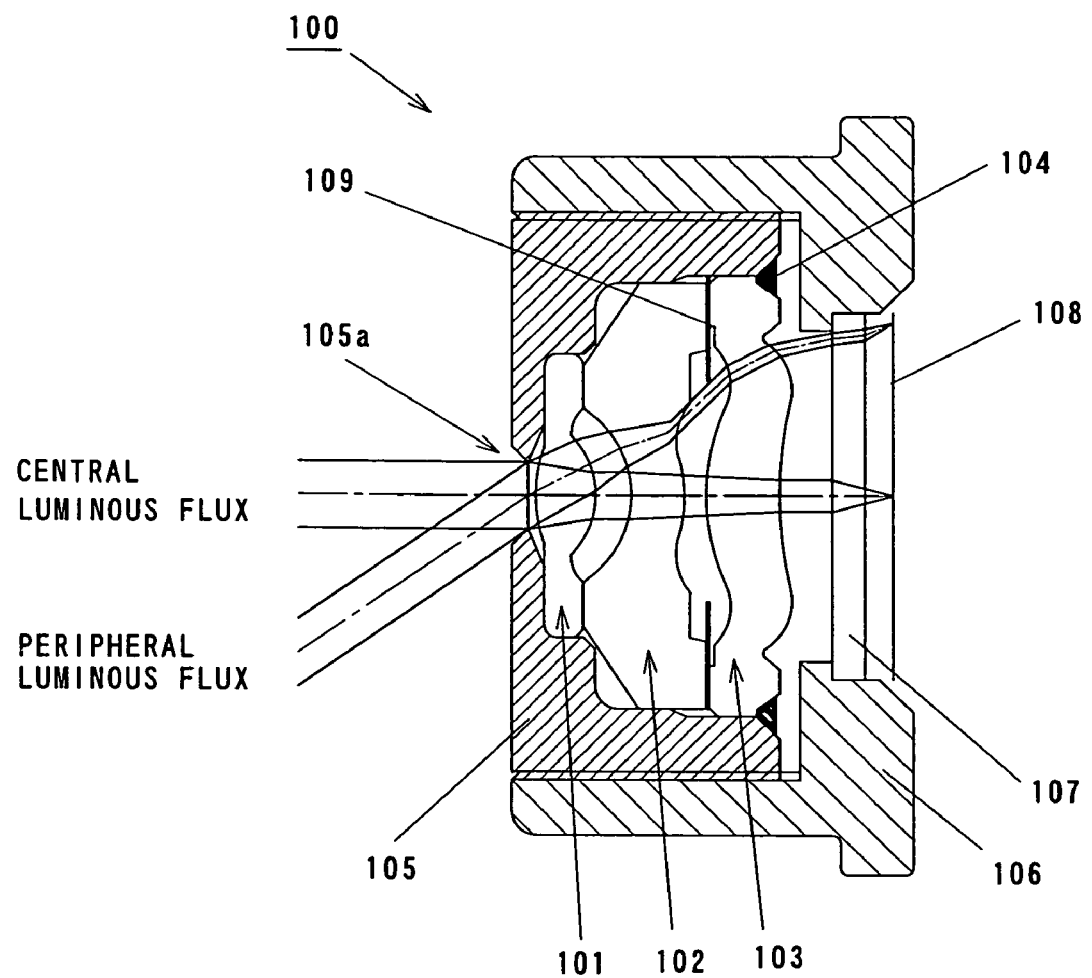
FIG. 1 is a diagram showing a sensor lens using an optical element of the conventional art.

In a sensor lens 100 comprising first to third optical elements 101 to 103 as shown in FIG. 1, it is assumed that the surface reflection of the optical element that is regarded as a cause of a ghost occurs on an optical function surface 102*a* of the second optical element 102 as shown in FIG. 4(*a*), the surface reflection occurs in flanges 102*b* and 102*c* of the second optical element 102 as shown in FIG. 4(*b*), and the surface reflection occurs in a flange 103*a* of the third optical element as shown in FIG. 4(*c*).

First, it was considered whether a ghost is caused by surface reflection on the optical function surface 102*a* of the second optical element 102.

An antireflection coating is applied to the optical element used for the sensor lens. Even when the antireflection coating is applied to the optical element, 2 to 4% reflection occurs thereon. In order to examine whether such a slight reflection causes a ghost or hot, antireflection coatings of different coating characteristics were applied to the optical element and it was examined whether the position and amount of a ghost are changed in the sensor lens 100 (see FIG. 1).

Even when antireflective coatings of different coating characteristics were applied to the second optical element, no change was found in the position and amount of a ghost. That is, it was found that surface reflection on the optical function surface 102*a* of the second optical element 102 does not cause a ghost.

Subsequently, it was examined whether a ghost is caused by surface reflection in the flange.

The sensor lens has a stopper which interrupts the entry of scattered light into a sensor image-forming surface. The scattered light is caused by a light beam incident on the flange. The shape of the flange is designed so as to generate no ghost according to a simulation of internal reflection. However, the simulation of internal reflection may not be completely performed on the flange. Thus, rough machining or light shielding was performed on the flanges of the second optical element 102 and the third optical element 103 to find whether a change was made in the position and amount of a ghost in the sensor lens 100 (see FIG. 1).

Figure 5:
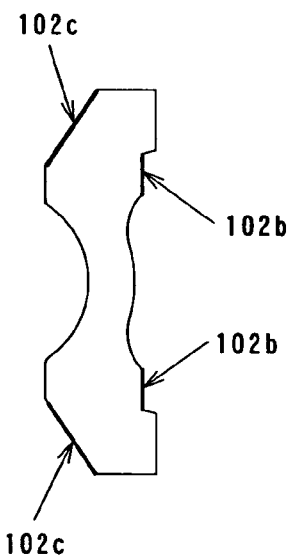
FIG. 5 is a diagram showing the optical element used in an experiment for examining a cause of a ghost.
Figure 5:
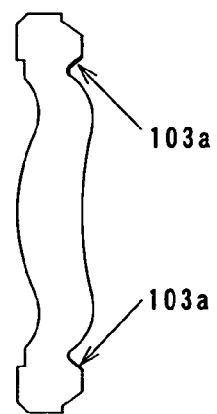

According to this experiment, in rough machining or light shielding on the flanges of the optical elements, the first flange 102*b* or the second flange 102*c* of the second optical element 102 was subjected to rough machining or light shielding as shown in FIG. 5(*a*) to examine the internal reflection of the flange (see FIG. 4(*b*)). Further, as shown in FIG. 5(*b*), the flange 103*a* of the third optical element 103 was subjected to rough machining or light shielding to examine the internal reflection of the flange (see FIG. 4(*c*)).

As a result, in the case of the second optical element 102 where the first flange 102*b* was subjected to rough machining, the position of a ghost is changed in the sensor lens 100. In the case of the second optical element 102 where the first flange 102*b* was subjected to light shielding, a ghost of the sensor lens 100 was prevented.

The inventor found that a burr occurs on a parting position 3 on the boundary of the optical function surface 1 and the flange 2 in the optical element where the optical function surface of high surface accuracy is formed by the cores whose parting diameter (transfer surface diameter) is equal to the optical surface diameter of the optical function surface of the optical element, and the inventor found that the burr is a cause of a ghost in the sensor lens.

Figure 6:
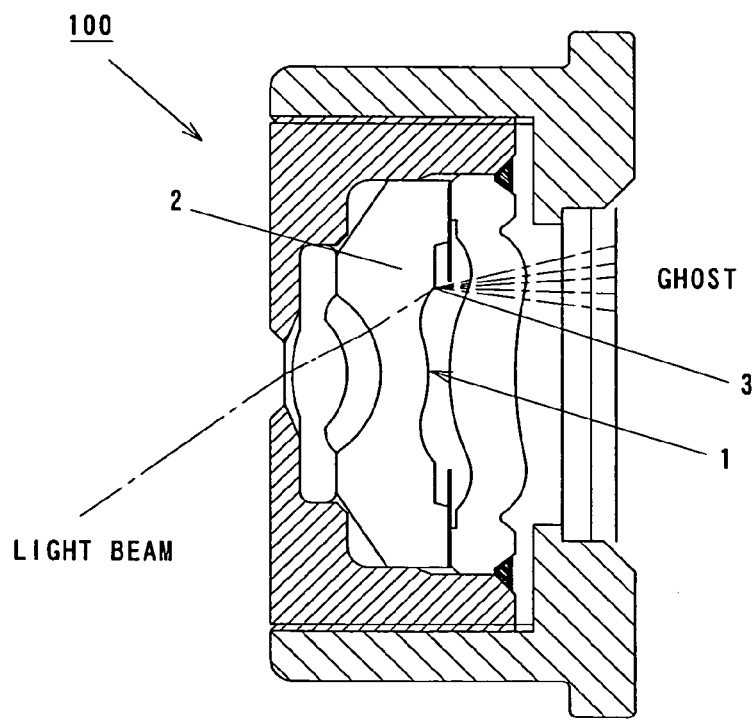
FIG. 6 is a diagram showing the occurrence of a ghost on a parting position.

That is, the inventor found that a resin material enters a small gap in a boundary of the cores 22 and 24 and the dies (the cope 21 and the drag 23) and causes a burr and a ghost is caused by a burr formed on the boundary (parting position 3) of the optical function surface 1 and the flange 2 of the optical element as shown in FIG. 6, in the optical element which is molded by the cores 22 and 24 having transfer surfaces of high surface accuracy to mold the optical function surface of high surface accuracy.

Hence, in the present invention, an optical element is provided in which the parting diameter of a molding die is made larger than an optical surface diameter set to have an effective diameter of high surface accuracy, a parting position is disposed outside the optical surface diameter in an optical element 10 constituted of an optical function surface 1 of high surface accuracy and a flange 2 formed around the surface 1, and thus a ghost is prevented in a sensor lens.

Figure 7:
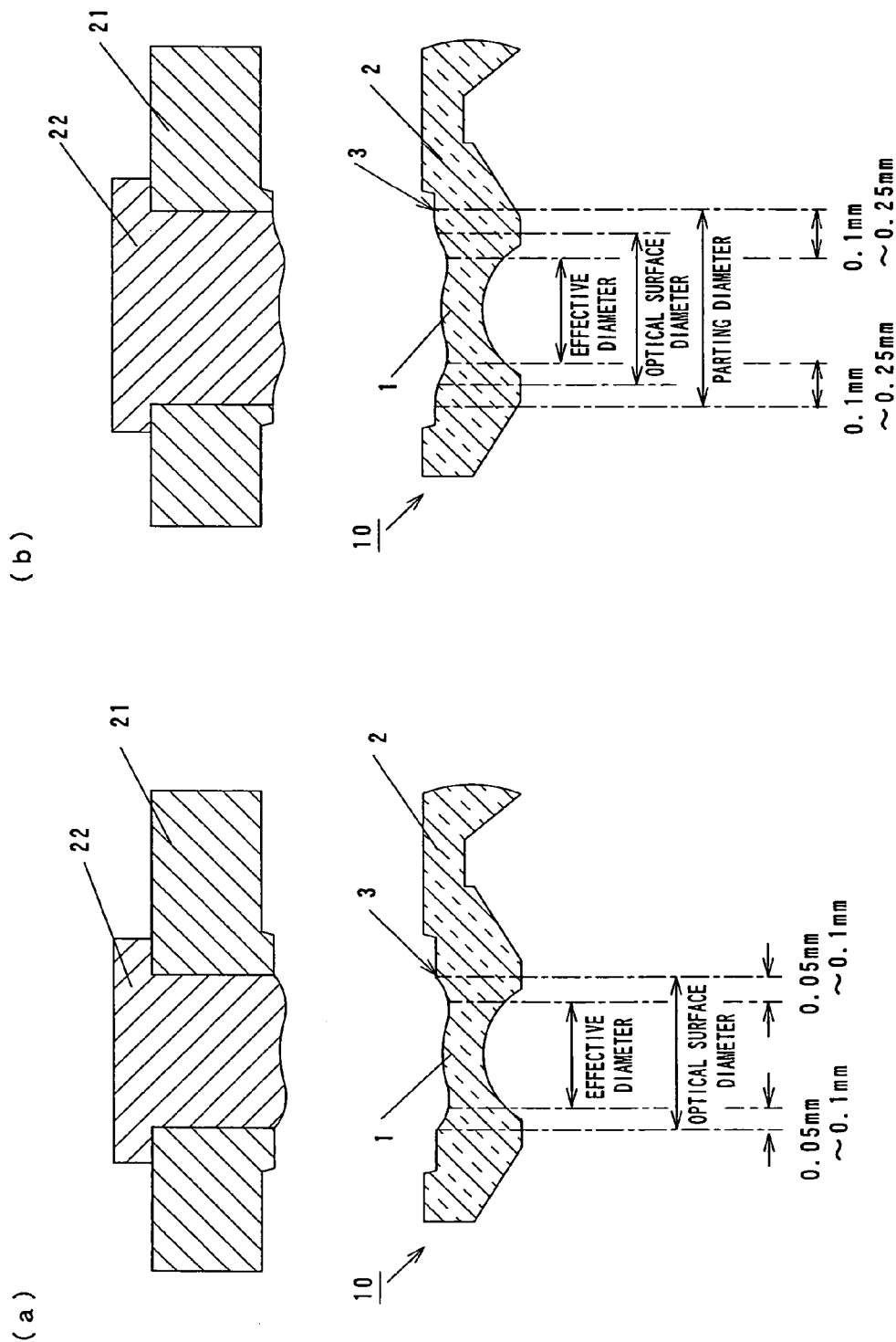
FIG. 7 is a diagram for explaining the optical element and a molding die of the present invention.

Referring to FIG. 7, the following will describe the optical element and a molding method thereof according to the present invention. FIG. 7 shows the optical element and the molding die (the cope 21 and the core 22) thereof.

As shown in FIG. 7(*a*), the optical element is constituted of the optical function surface of high surface accuracy and the flange formed around the surface. In order to secure high surface accuracy for an effective diameter, in the molding of the optical element 10 where the optical function surface is formed with an optical surface diameter somewhat larger than the effective diameter, the optical surface diameter and a parting diameter are equal to each other on the optical element which is molded by the core 22 whose parting diameter (transfer surface diameter) is equal to the optical surface diameter of the optical function surface. A parting position 3 is disposed on the boundary of the optical function surface 1 and the flange 2.

Thus, in the present invention, in the molding of the optical element 10 which is constituted of the optical function surface of high surface accuracy and the flange formed around the surface, the optical function surface having an optical surface diameter somewhat larger than the effective diameter in order to secure high surface accuracy for the effective diameter, the parting diameter of the molding die is made larger than the optical surface diameter by the core 24 whose parting diameter (transfer surface diameter) is larger than the optical surface diameter of the optical function surface as shown in FIG. 7(*b*), and the parting position 3 is disposed outside the optical surface diameter.

It is desirable that the parting diameter be 10% larger than the effective diameter of the optical function surface. In the example of FIG. 7(*b*), the parting diameter is about 0.2 to 0.5 mm larger than the effective diameter in the optical element 10 having a lens diameter of φ4 to φ7.

Figure 8:
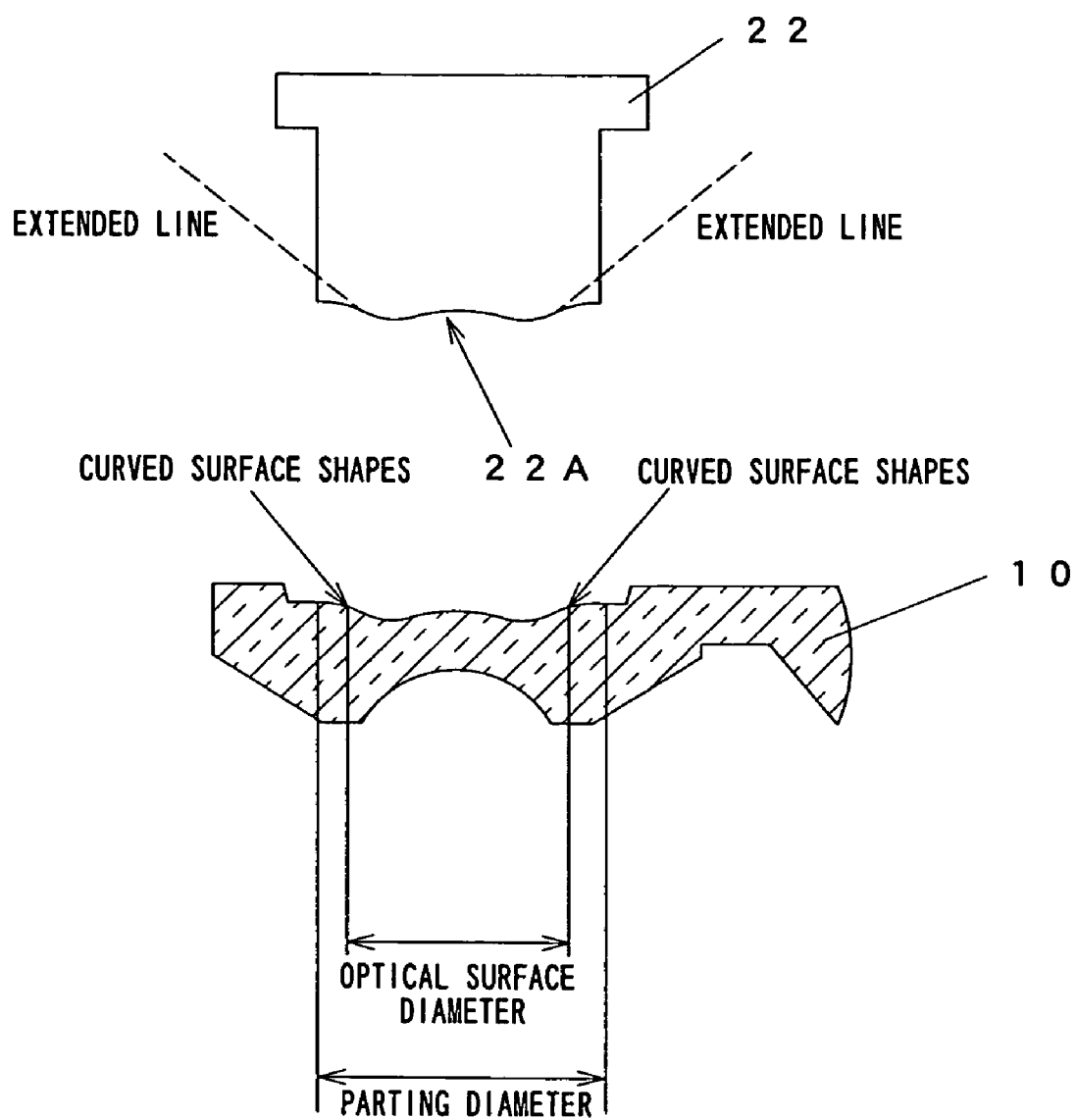
FIG. 8 is a diagram for explaining the optical element and the molding die of the present invention.

FIG. 8 shows the optical element and the molding die (the cope 21 and the core 22) thereof according to the present invention.

When the optical element 10 having the optical function surface of high surface accuracy is molded by using the core 22 having a transfer surface 22A of high surface accuracy, in the case of a parting position which is disposed outside the optical surface diameter of the optical element by using the core 22 whose parting diameter (transfer surface diameter) is increased by stretching the end of the optical function surface, the layer thickness of the optical function surface and the shape of the flange are changed substantially.

Thus, in the embodiment of FIG. 8, the optical element is molded in which a curved surface shapes is formed on the end of the optical function surface (the end of the optical surface) in the opposite direction to the end shape of the optical function surface and thus the parting position is disposed outside the optical surface. With this configuration, it is possible to make the parting diameter larger than the optical surface diameter and dispose the parting position outside the optical surface diameter without substantially changing the shape of the optical element.

Instead of the curved surface shapes formed in the opposite direction to the end shape of the optical function surface, an inclined straight shape in the opposite direction to the end shape of the optical function surface may be used.

Figure 9:
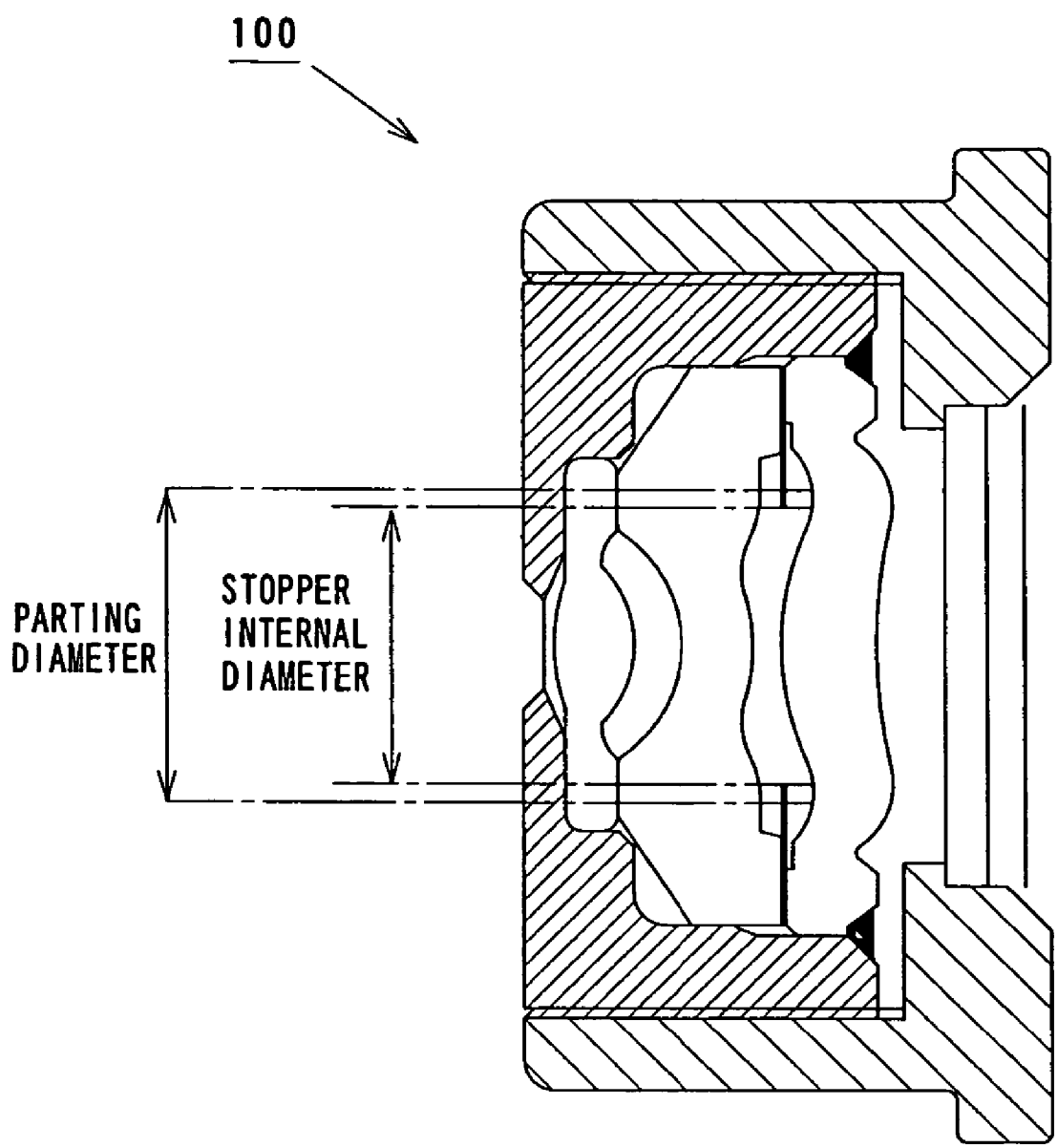
FIG. 9 shows a sensor lens using the optical element of the present invention.

FIG. 9 shows a sensor lens 100 using the optical element of the present invention.

As shown in FIG. 9, the sensor lens uses the optical element in which the curved surface shapes is formed on the end of the optical function surface (the end of the optical surface) in the opposite direction to the end shape of the optical function surface and thus the parting position 3 is disposed outside the optical surface diameter, and the parting position 3 of the optical element is disposed outside the internal diameter of a stopper 109 of the sensor lens. Thus, even when light is scattered by a burr formed on the parting position 3, the scattered light is interrupted by the stopper 109 and thus it is possible to prevent a ghost in the sensor lens.

What is claimed is:

1. An optical device, comprising:
   an optical element;
   an optical element arrangement mounting said optical element and defining an effective diameter of said optical element;
   said optical element including:
   an optical function surface of high surface accuracy;
   a flange formed around the optical function surface;
   the optical function surface having an optical surface diameter larger than said effective diameter providing high surface accuracy for an effective diameter area defined by the effective diameter; and
   the optical clement having a core mold transferred surface including said optical function surface, said core mold transferred surface being defined by a core mold of molding die, the core mold having a parting diameter larger than the optical surface diameter on the same surface of the optical element, and a parting position is disposed outside the optical surface diameter;
   whereby the core mold is adapted such that no burrs occur on the optical function surface, thereby preventing ghosts and flares from occurring in the optical element arrangement.

2. The optical element according to claim 1, wherein the parting diameter is larger than the effective diameter of the optical function surface by 10% or more.

* * * * *